(12) United States Patent
Gähwiler

(10) Patent No.: US 6,326,734 B1
(45) Date of Patent: Dec. 4, 2001

(54) SECURITY AND FASHION SOLAR LAMPS WITHOUT EXTRANEOUS CURRENT SOURCE

(75) Inventor: Benno Gähwiler, Bottighofen (CH)

(73) Assignee: Gertrud Balmer, Bottighofen (CH)

( * ) Notice: Subject to any disclaimer, the term of this patent is extended or adjusted under 35 U.S.C. 154(b) by 0 days.

(21) Appl. No.: 09/380,570

(22) PCT Filed: Mar. 9, 1998

(86) PCT No.: PCT/IB98/00305

§ 371 Date: Feb. 8, 2000

§ 102(e) Date: Feb. 8, 2000

(87) PCT Pub. No.: WO98/40663

PCT Pub. Date: Sep. 17, 1998

(30) Foreign Application Priority Data

Mar. 13, 1997 (CH) .................................................. 0600/97

(51) Int. Cl.$^7$ ................................................. H05B 37/02
(52) U.S. Cl. ..................... 315/149; 315/159; 315/200 A; 362/106; 362/113; 362/812
(58) Field of Search .................... 315/149, 158, 315/159, 200 A, 241 P, 308; 362/32, 106, 113, 194, 183, 252, 800, 806, 812

(56) References Cited

U.S. PATENT DOCUMENTS

| 4,827,534 | * | 5/1989 | Haugen | 2/108 |
| 4,875,144 | * | 10/1989 | Wainwright | 362/103 |
| 5,111,366 | * | 5/1992 | Rife et al. | 362/31 |
| 5,249,106 | * | 9/1993 | Barnes et al. | 362/108 |
| 5,276,424 | * | 1/1994 | Hegemann | 362/109 X |
| 5,839,816 | * | 11/1998 | Varga et al. | 362/153.1 |

FOREIGN PATENT DOCUMENTS

| 9116123 | * | 2/1992 | (EP) . |
| 2253129 | * | 9/1992 | (EP) . |
| 19504096 | * | 8/1995 | (EP) . |
| 19511813 | * | 10/1996 | (EP) . |

* cited by examiner

*Primary Examiner*—Haissa Philogene

(57) ABSTRACT

A solar light device is provided which is activated at the onset of darkness, which self-charges with solar energy and is independent of any source of energy. The solar light device includes a luminescent layer of foil which is operated by solar cells or a solar cell laminate. At least one accumulator is providing for accumulating energy from the solar cells. Control system electronics regulates the charging and discharging process of the least one accumulator and controls operation of the luminescent foil. The luminescent foil serves to increase visibility and thus safety or visual attractiveness.

8 Claims, 2 Drawing Sheets

ND FASHION SOLAR LAMPS
SECURITY AND FASHION SOLAR LAMPS WITHOUT EXTRANEOUS CURRENT SOURCE

FIELD OF THE INVENTION

The invention concerns a Security and Fashion Solar Light based on a solar-driven device, thus independent of external sources of energy, which thanks to an activated luminescent layer of foil increases visibility and thus safety.

BACKGROUND OF THE INVENTION

As situations are always arising in traffic, or when catastrophes occur, or in dangerous places of work or very secluded places, where it is very important to be seen, there is a need for a device to provide light without any effort on the part of the user.

SUMMARY OF THE INVENTION

The present invention solves this problem by providing a solar light device which is activated at the onset of darkness, which self-charges with solar energy and is independent of any source of energy. The solar light device includes a luminescent layer of foil which is operated by solar cells or a solar cell laminate. At least one accumulator is providing for accumulating energy from the solar cells. Control system electronics regulates the charging and discharging process of the least one accumulator and controls operation of the luminescent foil. The luminescent foil serves to increase visibility and thus safety or visual attractiveness.

DETAILED DESCRIPTION OF THE INVENTION

Figure 1:
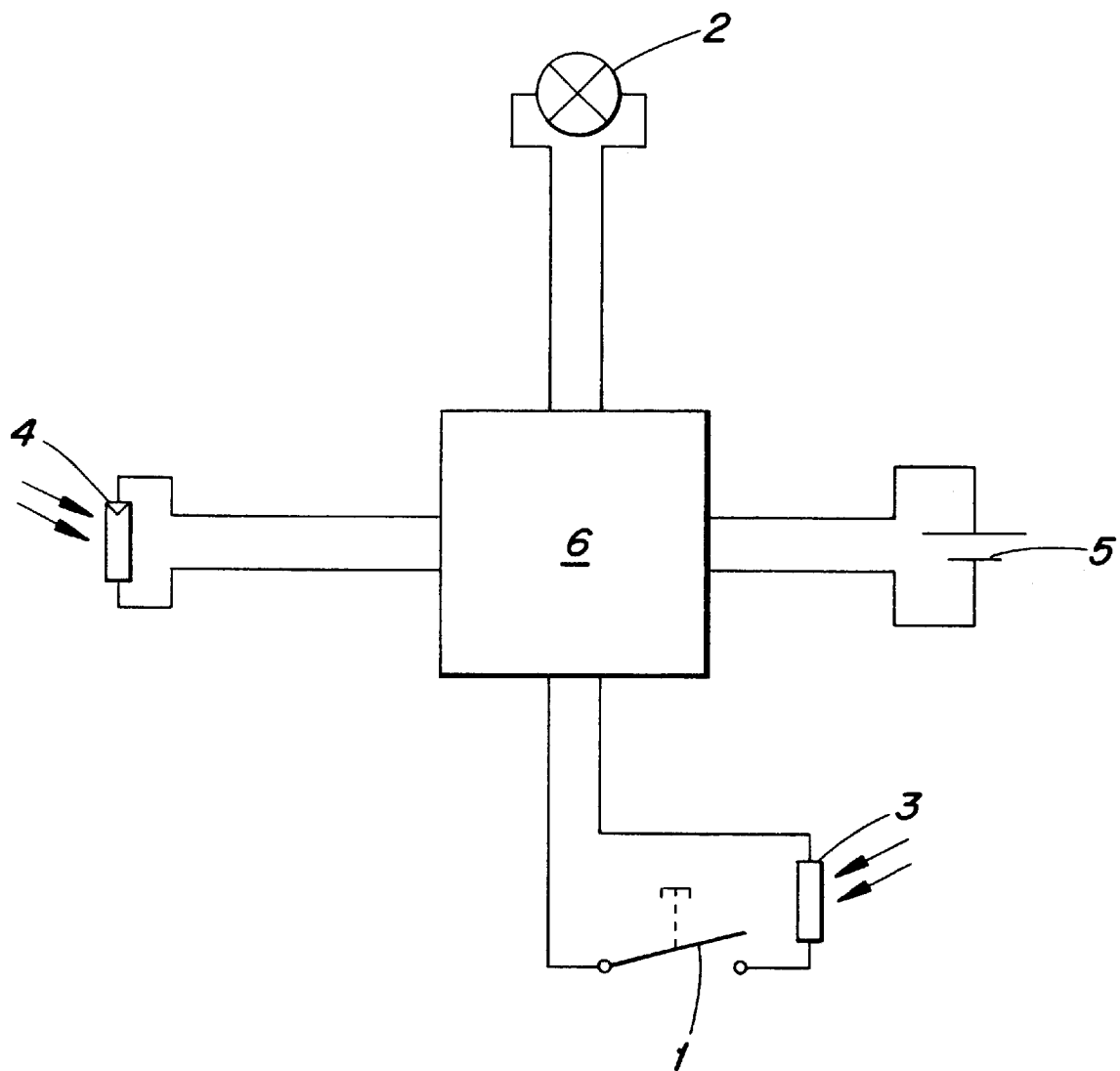
FIG. 1 shows a circuit diagram.
Figure 2:
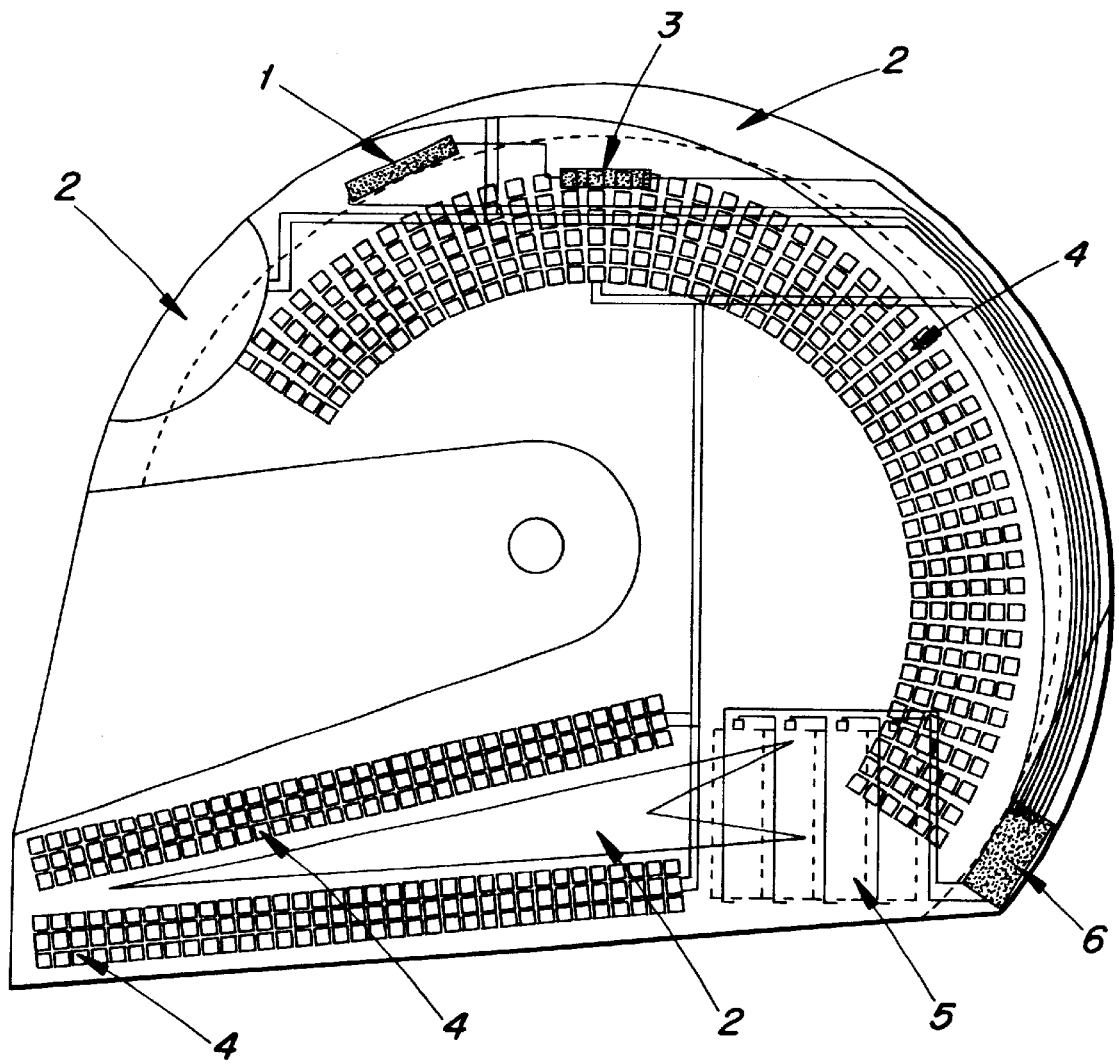
FIG. 2 shows an example in practice of a solar light device according to the invention.

With reference to FIG. 1, the solar light device in accordance with the present invention includes solar cells 4 which are mounted on a lighting element 2, which is preferably a movable layer of luminescent foil. Preferably, the solar cells are in the form of a solar cell laminate. The solar cells 4 are used to produce energy and to feed the accumulators 5 which are also bound together to larger or smaller accumulator packs 5 depending on their purpose. The accumulators accumulate the energy from the solar cells 4.

Control system electronics 6 regulates the charging and discharging functions of the accumulators 5. According to a first embodiment, a snap switch or key-button 1 gives the control system electronics 6 the impulses to set the lighting element 2 into operation. Depending on the purpose, it makes sense to automate the switch-on operation. In this case, the lighting element 2 is activated with the help of one or more photocells 3 which, at the onset of darkness, give the control system electronics 6 the impulse. As in the sketched example, key-button 1 and photocell 3 can also be used in combination. The lighting element 2 is made up of a hard or flexible luminescent layer of foil which can be selected in different colors depending on the signal function. Preferably, the luminescent foil is electro-luminescent foil. Thanks to flexibility in the field of energy production as well as the source of light using laminates and also a choice of different colors and shapes, fashion aspects can also be considered, and thus the invention can also be used in the commercial fashion trade. In particular, the solar light device may be applied to all outer clothing, helmets, headgear of all kinds, protective and working clothes, costumes of all kinds, school-bags, rucksacks and bags of all kinds, toys and baby-strollers. It may also be applied to collars for animals as well as protective covers, fashion capes and cuffs for people and animals. The solar light device according to the present invention may also be applied as a finish for land, sea or air vehicles, as well as on signs and signals in traffic, in the mountains and on ships as well as on other exterior signposts.

The principles, preferred embodiments and manner of use of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A solar light device which is activated at the onset of darkness, which self-charges with solar energy and is independent of any source of energy, comprising:

a hard or flexible luminescent layer of foil;

solar cells or a solar cell laminate for operating the luminescent layer of foil;

at least one accumulator for accumulating energy from the solar cells;

control system electronics for regulating the charging and discharging process of the at least one accumulator and for controlling operation of the luminescent layer of foil, the luminescent layer of foil serving to increase visibility.

2. The device in accordance with claim 1, wherein the solar cell laminate or solar cells include a hard or flexible layer of foil, and the solar cell laminate or the solar cells are mounted on the hard or flexible layer of foil.

3. The device in accordance with claim 1, wherein said control system electronics includes a control element for operating the luminescent layer of foil, the control element being designed as a snap switch, key-button and/or photocell.

4. The device in accordance with claim 1 for increasing the safety for all outer clothing, helmets, headgear of all kinds, protective and working clothes, costumes of all kinds, school-bags, rucksacks and bags of all kinds, toys and baby-strollers.

5. The device in accordance with claim 1 for increasing the safety for collars for animals as well as protective covers, fashion capes and cuffs for people and animals.

6. The device in accordance with claim 1 for increasing the safety or also as a finish for land, sea and air vehicles.

7. The device in accordance with claim 1 for increasing the safety of signs and signals in traffic, in the mountains and on ships as well as on other exterior signposts.

8. The device in accordance with claim 1, wherein the luminescent foil is electro-luminescent foil.

* * * * *